(12) United States Patent
Islam et al.

(10) Patent No.: US 12,509,020 B2
(45) Date of Patent: Dec. 30, 2025

(54) METHOD AND SYSTEM FOR AUTHENTICATING AND SECURING VEHICULAR SERVICES

(71) Applicant: GM Global Technology Operations LLC, Detroit, MI (US)

(72) Inventors: Md Mhafuzul Islam, Warren, MI (US); Asif Rabbani, Sterling Heights, MI (US); Randy L. Swafford, Chesterfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 279 days.

(21) Appl. No.: 18/481,608

(22) Filed: Oct. 5, 2023

(65) Prior Publication Data

US 2025/0115210 A1    Apr. 10, 2025

(51) Int. Cl.
| | |
|---|---|
| *B60R 25/102* | (2013.01) |
| *B60R 25/24* | (2013.01) |
| *B60R 25/25* | (2013.01) |
| *G07C 9/00* | (2020.01) |
| *G07C 9/37* | (2020.01) |
| *B60R 25/10* | (2013.01) |

(52) U.S. Cl.
CPC ............ *B60R 25/102* (2013.01); *B60R 25/24* (2013.01); *B60R 25/25* (2013.01); *G07C 9/00309* (2013.01); *G07C 9/00896* (2013.01); *G07C 9/37* (2020.01); *B60R 2025/1016* (2013.01); *G07C 2009/005* (2013.01); *G07C 2009/00793* (2013.01); *G07C 2009/00928* (2013.01)

(58) Field of Classification Search
None
See application file for complete search history.

(56) References Cited

U.S. PATENT DOCUMENTS

| | | | |
|---|---|---|---|
| 7,768,377 B2 * | 8/2010 | Brey | B60R 25/2018 340/425.5 |
| 10,629,012 B1 * | 4/2020 | Gattu | B60R 25/246 |
| 10,750,128 B2 * | 8/2020 | Fu | H04N 7/0806 |
| 11,749,043 B2 * | 9/2023 | Chafni | G07C 9/10 340/5.52 |
| 2020/0062215 A1 * | 2/2020 | Schuller | G05D 1/0011 |

FOREIGN PATENT DOCUMENTS

WO    WO-2025039693 A1 *    2/2025    ....... G06Q 20/40145

* cited by examiner

*Primary Examiner* — K. Wong
(74) *Attorney, Agent, or Firm* — Vivacqua Crane, PLLC

(57) ABSTRACT

A method of authenticating and securing a vehicular service includes receiving, by a controller of a vehicle, an activation signal. The activation signal is indicative that the vehicular service has been requested by a vehicle user. The method further includes determining whether a registered vehicle operator of the vehicle is the vehicle user that requested the vehicular service in response to receiving the activation signal. Moreover, the method includes sending a notification to the registered vehicle operator of the vehicle that an unauthorized entry of the vehicle has occurred in response to determining that the registered vehicle operator of the vehicle is not the vehicle user that requested the vehicular service. The method may also include the delegation of authorization to other people, contacting emergency services upon hostage situation, family-friends pre-authentication, etc.

20 Claims, 3 Drawing Sheets

METHOD AND SYSTEM FOR AUTHENTICATING AND SECURING VEHICULAR SERVICES

INTRODUCTION

The present disclosure relates to a system and method for authenticating and securing vehicular services.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some vehicle can provide vehicular services, such as transmitting a radio signal to open a garage door. While these services are quite convenient, there is a need for allowing solely authorized vehicle users to use these services.

SUMMARY

The present disclosure describes a method for authenticating and securing vehicular services. The method includes receiving, by a controller of a vehicle, an activation signal. The activation signal is indicative that the vehicular service has been requested by a vehicle user. The method further includes determining whether a registered vehicle operator of the vehicle is the vehicle user that requested the vehicular service in response to receiving the activation signal. The first level of authentication is performed by using the driver monitoring system, facial/fingerprint, voice recognition etc. when the vehicle user is inside the vehicle and then the second level of authentication is the 2-factor system. In response to determining that the registered vehicle operator of the vehicle is not the vehicle user that requested the vehicular service, sending a notification to the registered vehicle operator of the vehicle that an unauthorized entry of the vehicle has occurred. Other embodiments of this aspect include corresponding computer systems, apparatus, and computer programs recorded on one or more computer storage devices, each configured to perform the actions of the methods. The method described improves vehicle technology by restricting the use of vehicular services in a vehicle by unknown/unauthorized/new users, thereby enhancing security in the vehicle.

Implementations may include one or more of the following features. The method may include requesting a pre-authenticated code in response to determining that the registered vehicle operator of the vehicle is the vehicle user that requested the vehicular service. Further, the method includes receiving, by the controller of the vehicle, the pre-authenticated code and, in response to receiving the pre-authenticated code, providing the vehicular service. The vehicular service includes sending a garage door signal to remotely open or close a garage door. Enabling the two-factor authentication delegation includes identifying a delegate that is authorized to use the vehicular service. The method includes generating a two-factor random code in response to determining that the two-factor authentication delegation has been enabled and sending the two-factor random code to the delegate. The method may include requesting the two-factor random code from the delegate, receiving the two-factor random code from the delegate, and in response to receiving the two-factor random code from the delegate, providing the vehicular service. The method may include requesting the two-factor random code from the delegate. Further, the method includes receiving an input from the vehicle user in response to requesting the two-factor random code from the delegate and determining that the input does not match the two-factor random code. Also, the method includes refraining from providing the vehicular service in response to determining that the input does not match the two-factor random code. The method may include counting a number of times that the vehicle user has provided an input that does match the two-factor random code, and in response to determining that the vehicle user has provided an input that does not match the two-factor random code more than the predetermined number of times, sending the notification to the registered vehicle operator of the vehicle that an unauthorized entry of the vehicle has occurred. The method may include using facial recognition, voice recognition, and/or fingerprint authentication to determine whether the registered vehicle operator is the vehicle user that requested the vehicular service. Implementations of the described techniques may include hardware, a method or process, or computer software on a computer-accessible medium.

The present disclosure also describes a system for authenticating and securing vehicular services. The system includes a plurality of sensors, a communication transceiver, a controller in communication with the sensors and the communication transceiver. The controller is programmed to execute the method described above.

In an aspect of the present disclosure, the method includes receiving, by a controller of a vehicle, an activation signal. The activation signal is indicative that the vehicular service has been requested by a vehicle user. The method further includes determining whether a registered vehicle operator of the vehicle is the vehicle user that requested the vehicular service in response to receiving the activation signal. Further, the method includes providing the vehicular service in response to determining that the registered vehicle operator of the vehicle is the vehicle user that requested the vehicular service.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
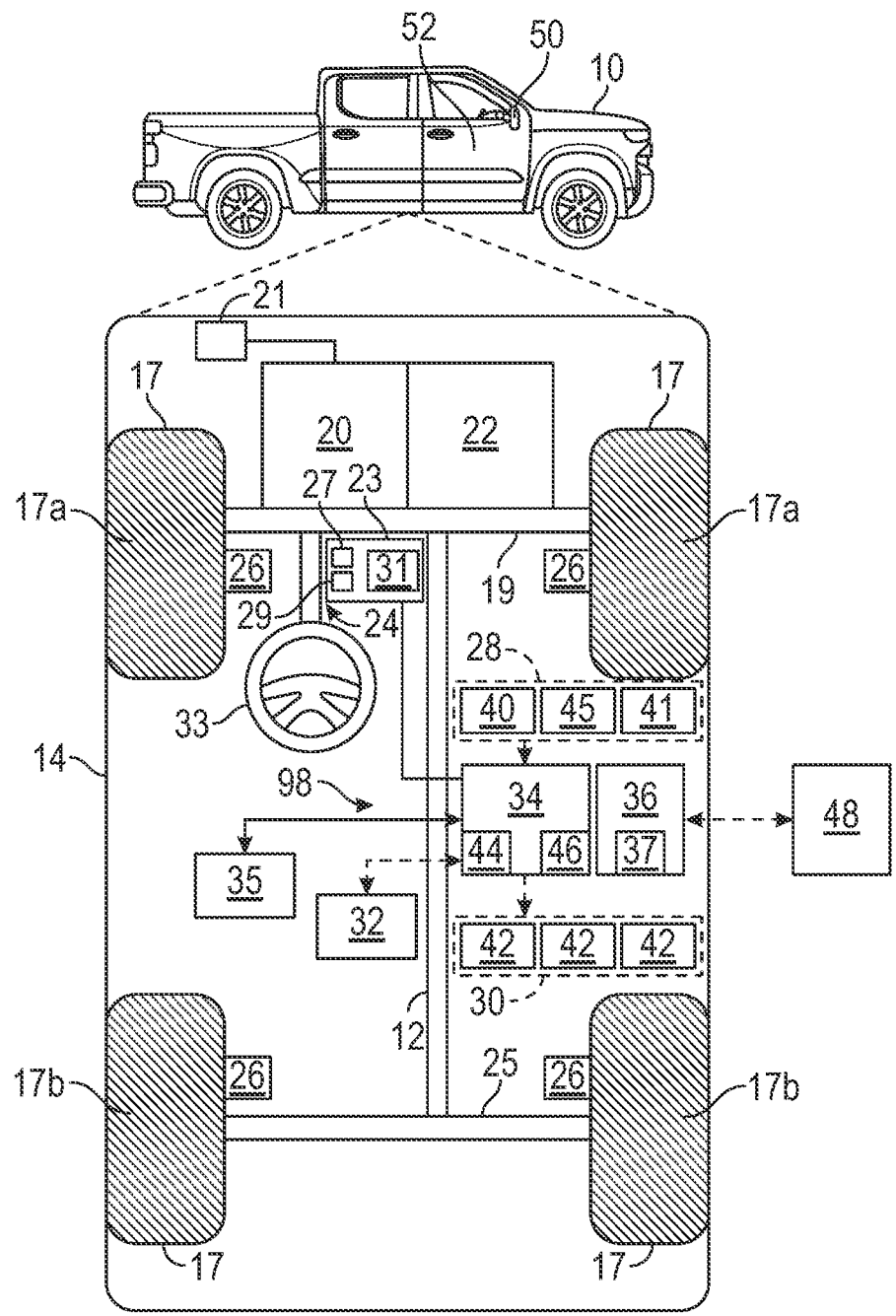
FIG. 1 is a block diagram depicting a vehicle.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 generally includes a chassis 12, a body 14, front and rear wheels 17 and may be referred to as a vehicle system. In the depicted embodiment, the vehicle 10 includes two front wheels 17a and two rear wheels 17b. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14. The vehicle 10 includes a front axle 19 coupled to the front wheels 17a and a rear axle 25 coupled to the rear wheels 17b.

The vehicle 10 may be an autonomous vehicle, and a system 98 may be part or work together with the vehicle 10. The vehicle 10 is, for example, a vehicle that is automatically controlled to carry passengers from one location to another. The vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the vehicle 10 may include a so-called a Level Two, a Level Three, Level Four, or Level Five driving automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the system 98 performs the entire dynamic driving task (DDT) within the area that it is designed to do so. In Level 2 vehicles, systems provide steering, brake/acceleration support, lane centering, and adaptive cruise control. However, even if these systems are activated, the vehicle operator at the wheel must be driving and constantly supervising the automated features.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The steering system 24 is a steer-by-wire system. The propulsion system 20 may, in various embodiments, include an electric machine such as a traction motor and/or a fuel cell propulsion system. The vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences the position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more steering wheel sensors 40, one or more radars, one or more light detection and ranging (lidar) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more vehicle cameras 41, one or more gyroscopes, one or more accelerometers, one or more inclinometers, one or more speed sensors, one or more ultrasonic sensors, one or more inertial measurement units (IMUs), one or more night-vision devices, thermal imaging sensors, and/or other sensors. Each sensor 40 is configured to generate a signal that is indicative of the sensed observable conditions of the exterior environment and/or the interior environment of the vehicle 10. Because the sensor system 28 provides data to the controller 34, the sensor system 28 and its sensors 40 are considered sources of information (or simply sources). The vehicle 10 and/or system 98 does not include light sensors capable of detecting light inside the vehicle 10.

The actuator system 30 includes one or more actuator 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors 52, a trunk, and cabin features such as air, music, lighting, etc.

The data storage device 32 stores data for use in automatically controlling the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. The data storage device 32 may be part of the controller 34, separate from the controller 34, or part of the controller 34 and part of a separate system.

The vehicle 10 may further include one or more airbags 35 in communication with the controller 34 or another controller of the vehicle 10. The airbag 35 includes an inflatable bladder and is configured to transition between a stowed configuration and a deployed configuration to cushion the effects of an external force applied to the vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10. The controller 34 of the vehicle 10 may be referred to as a controller and may be programmed to execute a method 100 (FIG. 3) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the vehicle 10. In various embodiments, one or more instructions of the controller 34 are embodied in the control system 98.

The vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the vehicle 10. The user interface 23 is in electronic communication with the controller 34 and is configured to receive inputs by a vehicle user 11 (e.g., a vehicle driver or a vehicle passenger). For example, the user interface 23 may include a touch screen and/or buttons configured to receive inputs from a vehicle user 11. Accordingly, the controller 34 is configured to receive inputs from the user via the user interface 23. The vehicle 10 may include one or more displays 29 configured to display information to the vehicle user 11 (e.g., vehicle operator or passenger).

The communication system 36 is in communication with the controller 34 and is configured to wirelessly communicate information to and from other remote entities 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the vehicle 10 while not physically connected to the vehicle 10. In certain embodiments, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the vehicle 10 and another vehicle. Further, the communication system 36 is configured to wirelessly communicate information between the vehicle 10 and infrastructure or other vehicles.

Figure 2:
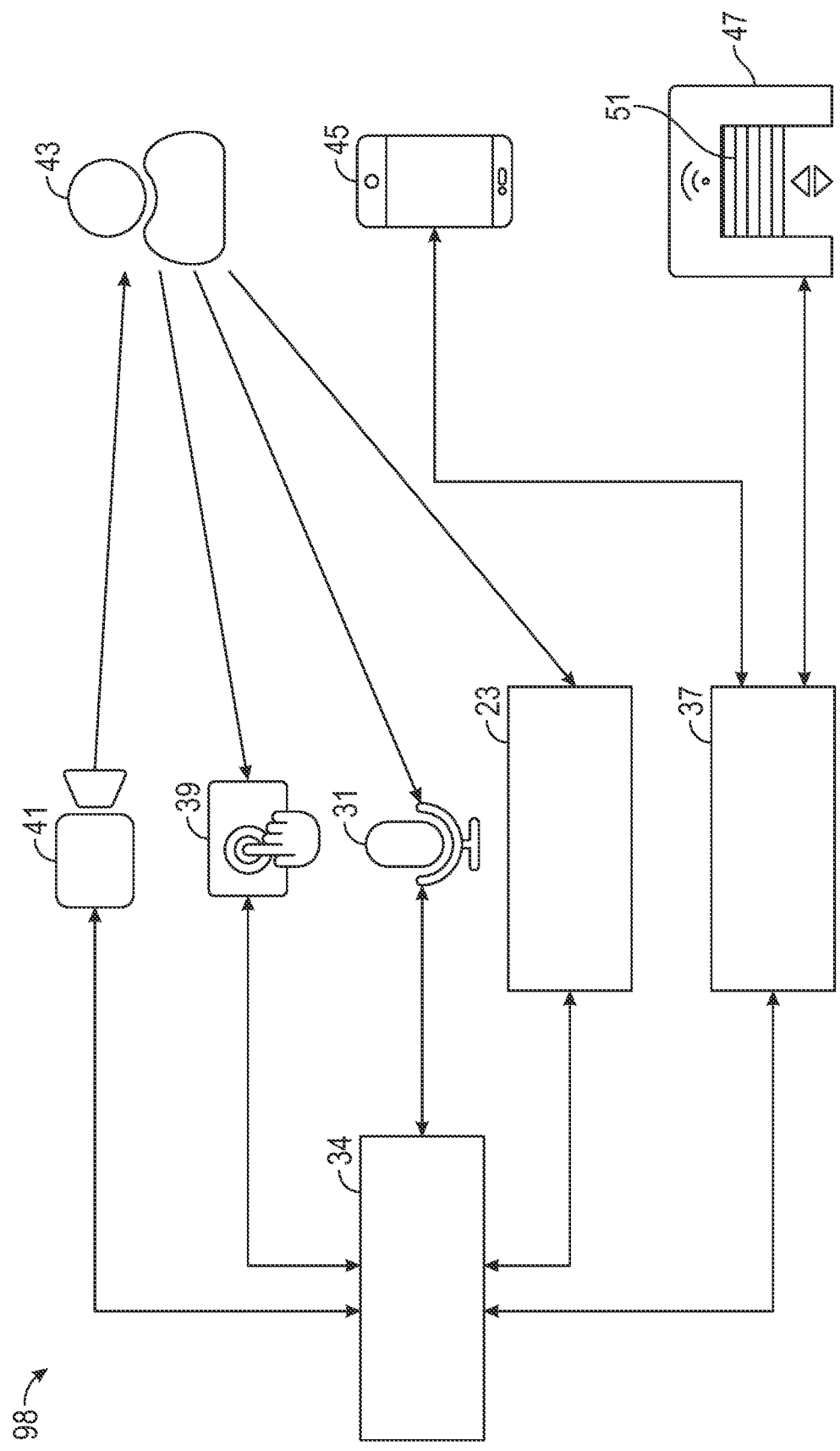
FIG. 2 is a schematic diagram of a system for authenticating and securing vehicular services.

FIG. 2 shows the system 98, which is configured for authenticating and securing vehicular services. The system 98 includes the controller 34, one or more vehicle cameras 41, one or more fingerprint sensors 39, one or more microphones 31, the user interface 23, and/or one or more communication transceivers 37. The vehicle cameras 41, the microphones 31, fingerprint sensors 39 the user interface 23, and the communication transceivers 37 are in communication with the controller 34.

The fingerprint sensors 39 may be capacitive sensors (which use a finger's natural electrical conductivity to read prints), optical sensors that read the image of a fingerprint by using a light source that illuminates ridges in contact with the reader and reads them through a prism, and/or ultrasonic sensors that emit an ultrasonic pulse that generates an echo that's read by the sensor, with ridges and valleys registering different signatures. The fingerprint sensors 39 are used to perform fingerprint authentication by comparing the input fingerprint to the fingerprint that's enrolled.

The controller 34 is programmed to determine whether the registered vehicle operator is the vehicle user 43 that requested a vehicular service using voice recognition, fingerprint authentication, facial recognition and/or other biometrics. To do so, the controller 34 may use the sensor signals generated by the microphones 31, the vehicle cameras 41, and/or the fingerprint sensors 39.

As discussed above, the controller 34 is in communication with the communication transceivers 37 and the user interface 23. The controller 34 is programmed to provide notifications to the registered vehicle operator through the user interface 23 and/or by sending notices and/or messages to an app running on the mobile device 45, such as a smartphone or a smart tablet, through the communication transceivers 37. The controller 34 may also command the communication transceiver 37 to transmit a signal, such as a radio signal, to perform a vehicular service, such as opening a garage door 51 of a garage 47.

Figure 3:
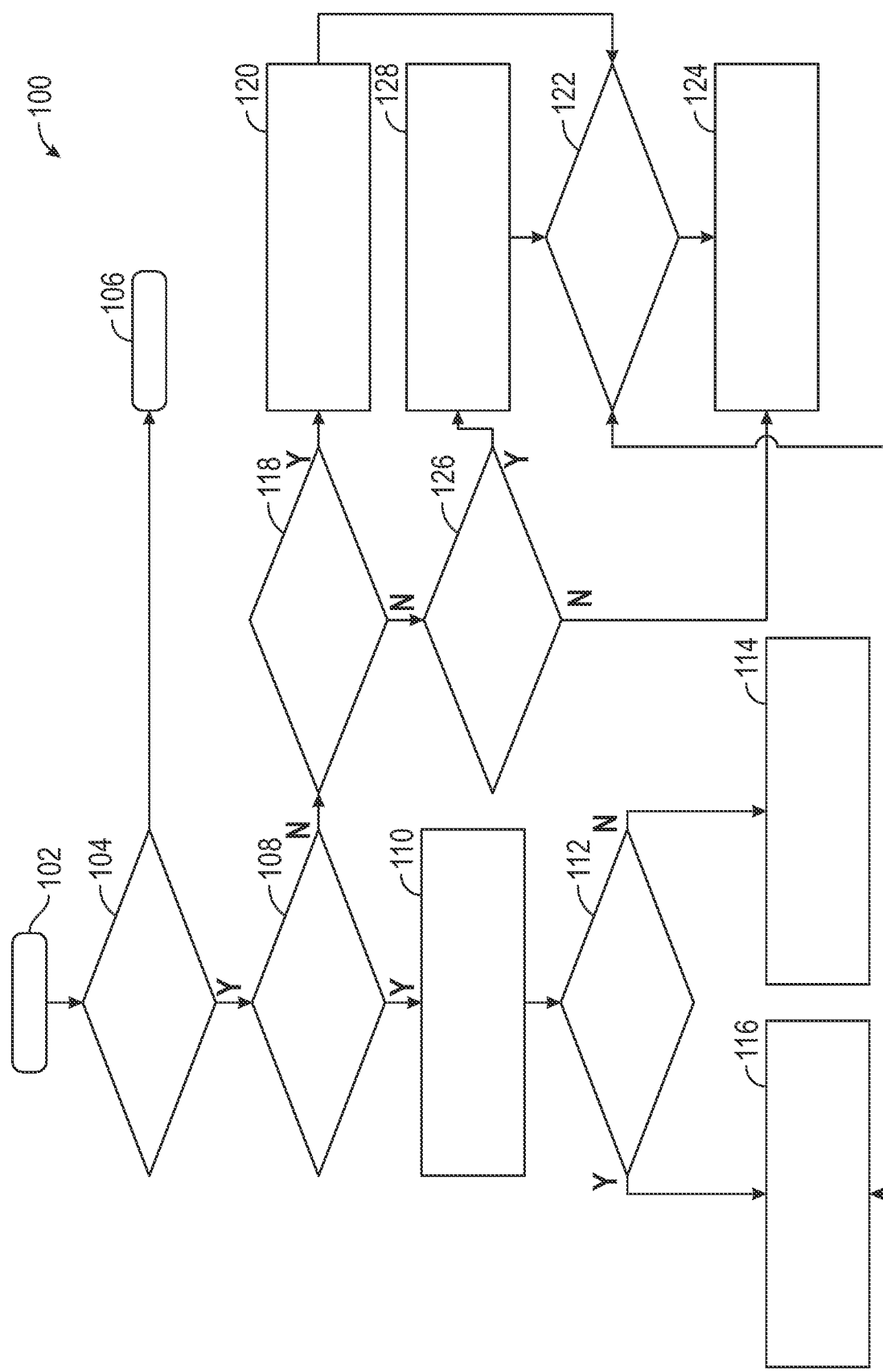
FIG. 3 is a flowchart of a method for authenticating and securing vehicular services.

FIG. 3 is a flowchart of a method 100 for authenticating and securing vehicular services. The vehicular service may be requested by a user inside the vehicle (i.e., opening a garage door) or by a vehicle user outside the vehicle 10 (i.e., opening a door of the vehicle 10). The method 100 begins at block 102. Then, the method 100 continues to block 104. At block 104, the controller 34 first receives an activation signal. The activation signal is indicative that a vehicular service has been requested by the vehicle user 43 of the vehicle 10. The vehicular service may include remote start, enable heated seats, enable Wi-Fi, sending a signal to open the garage door 51, etc. The vehicle user 43 may select to perform the vehicular service by inputting a selection in the user interface 23. In response to this selection, the user interface 23 sends the activation signal to the controller 34. Upon receipt of the activation signal, the controller 34 determines whether the feature of the selected as been enables. For example, in some circumstances, the vehicular service is a subscription-based vehicular service, such as heated seats, and the subtraction has not been paid for that vehicular service. In such a case, the subscription-based vehicular service is not enabled if the subscription has not been paid. If the subscription has been paid, then the subscription-based vehicular service is enabled. If the vehicular service is requested by the vehicle user 43 has not been enabled, then the method 100 continues to block 106. At block 106, the method 100 ends. If the vehicular service requested by the vehicle user 43 is enabled, then method 100 continues to block 108.

At block 108, the controller 34 determines whether a registered vehicle operator of the vehicle 10 is the vehicle user 43 that requested the vehicular service. To do so, the controller 34 may use inputs from one or more sensors 40, such as the vehicle cameras 41, the microphones 31, the fingerprint sensors 39 and/or other biometric sensors. The controller 34 may therefore use voice recognition, fingerprint authentication, facial recognition and/or other biometrics to determine whether the registered vehicle operator is the vehicle user 43 that requested the vehicular service. If the controller 34 determines that the registered vehicle operator is the vehicle user 43 that requested the vehicular service, then the method 100 continues to block 110.

At block 110, the controller 34 checks the eligibility of the vehicular service. The eligibility of the vehicular service may depend on numerous factors. For instance, if the vehicular service is opening the garage door 51, the controller 34 may determine whether there is a hostage situation. The camera 41 may use inputs from the camera 41 to determine that a hostage situation is occurring (e.g., a third party pointing a gun to (or otherwise threatening) the vehicle user 43). Then, the method 100 proceeds to block 112. In a hostage situation, opening the garage door 51 is not eligible. At block 112, the controller 34 assesses the inputs from the sensors 40 to determine the eligibility of the vehicular service. If the controller 34 determines that the vehicular service is not eligible, then the method 100 proceeds to block 114. At block 114, the controller 34 commands the user interface 23, the display 29, and/or the mobile device 45 to provide a notice to the vehicle user 43 that the vehicular service is not eligible. In a hostage situation, the controller 34 may inform emergency services that a hostage situation is occurring. If the controller 34 determines that the vehicular service is eligible, then the method 100 proceeds to block 116. At block 116, the controller 34 provides the vehicular service. For example, the controller 34 may command the communication transceiver to send a signal to open the garage door 51 of the garage 47.

Returning to block 108, if the controller 34 determines that the registered vehicle operator is not the vehicle user 43 that requested the vehicular service, then the method 100 continues to block 118. At block 118, the controller 34 determines whether the family and friend mode is enabled. Enabling the family and friend mode allows family and friends of the registered vehicle operator to use vehicular services. If the family and friend mode is enabled, then the method 100 continues to block 120.

At block 120, the controller 34 request the vehicle user 43 a pre-authenticated code. Registered authorized user of the vehicle 10, such as friend and family members of the registered vehicle operator (e.g., vehicle owner), may have the pre-authenticated code. The registered authorized user of the vehicle 10 may then input the pre-authenticated code through the user interface 23, and the controller 34 subsequently receives the pre-authenticated code or other input from the vehicle user 43. After block 120, the method 100 continues to block 122.

At block 122, the controller 34 counts the number of times that the vehicle user has provided an input that does match the pre-authenticated code. If the vehicle user 43 has provided an input that does not match the pre-authenticated code more than a predetermined number of times (e.g., five times), then the method 100 continues to block 124. At block 124, the controller 34 sends a notification to the registered vehicle operator (e.g., vehicle owner) of the vehicle 10 that an unauthorized entry of the vehicle 10 has occurred. For example, the notification may be sent to the mobile device 45 of the registered vehicle operator. Further, at block 124, the controller 34 refrains from providing the vehicular service. Returning to block 122, if the vehicle user 43 has provided an input that matches the pre-authenticated code any time in equal to or less than the predetermined number of times (e.g., five times), then the method 100 continues to block 116. At block 116, the controller 34 provides the vehicular service. For example, the controller 34 may command the communication transceiver to send a signal to open the garage door 51 of the garage 47.

Returning to block 118, if the family and friend mode is not enabled, then the method 100 continues to block 126. At block 126, the controller 34 determines whether two-factor authentication delegation has been enabled. Enabling the two-factor authentication delegation includes identifying a delegate that is authorized to use the vehicular service of the vehicle 10. If the two-factor authentication delegation has not been enabled, then the method 100 continues to block 124. As discussed above, at block 124, the controller 34 sends a notification to the registered vehicle operator (e.g., vehicle owner) of the vehicle 10 that an unauthorized entry of the vehicle 10 has occurred. For example, the notification may be sent to the mobile device 45 of the registered vehicle operator. Further, at block 124, the controller 34 refrains from providing the vehicular service. If the two-factor authentication delegation has been enabled, then the method 100 continues to block 128. At block 128, the controller 34 generates a two-factor random code. Further, the controller 34 sends the two-factor random code to the delegate through, for example, the mobile device 45 of the delegate. Then, the controller 34 request the two-factor random code from the delegate through, for example, the user interface 23 and/or the mobile device 45 to the delegate. Then, the controller 34 receives the two-factor random code from the delegate rough, for example, the user interface 23 and/or the mobile device 45 to the delegate. Then, the method 100 continues to block 122.

At block 122, the controller 34 counts the number of times that the vehicle user has provided an input that does match the two-factor random code. If the vehicle user 43 has provided an input that does not match the two-factor random code more than a predetermined number of times (e.g., five times), then the method 100 continues to block 124. At block 124, the controller 34 sends a notification to the registered vehicle operator (e.g., vehicle owner) of the vehicle 10 that an unauthorized entry of the vehicle 10 has occurred. For example, the notification may be sent to the mobile device

45 of the registered vehicle operator. Further, at block 124, the controller 34 refrains from providing the vehicular service. Returning to block 122, if the vehicle user 43 has provided an input that matches the pre-authenticated code any time in equal to or less than the predetermined number of times (e.g., five times), then the method 100 continues to block 116. At block 116, the controller 34 provides the vehicular service. For example, the controller 34 may command the communication transceiver to send a signal to open the garage door 51 of the garage 47.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method of authenticating and securing a vehicular service, comprising:
   receiving, by a controller of a vehicle, an activation signal, wherein the activation signal is indicative that the vehicular service has been requested by a vehicle user;
   in response to receiving the activation signal, determining whether the vehicular service is a subscription-based vehicular service;
   in response to determining that the vehicular service is a subscription-based vehicular service, determining whether the subscription-based vehicular service has been enabled via payment;
   in response to determining that the subscription-based vehicular service is enabled, determining whether a registered vehicle operator of the vehicle is the vehicle user that requested the vehicular service; and
   in response to determining that the registered vehicle operator of the vehicle is not the vehicle user that requested the vehicular service, sending a notification to the registered vehicle operator of the vehicle that an unauthorized entry of the vehicle has occurred.

2. The method of claim 1, further comprising:
   in response to determining that the registered vehicle operator of the vehicle is the vehicle user that requested the vehicular service, requesting a pre-authenticated code;
   receiving, by the controller of the vehicle, the pre-authenticated code; and
   in response to receiving the pre-authenticated code, providing the vehicular service.

3. The method of claim 2, wherein the vehicular service includes sending a garage door signal to remotely open or close a garage door.

4. The method of claim 2, further comprising:
   in response to determining that the registered vehicle operator of the vehicle is not the vehicle user that requested the vehicular service, determining whether two-factor authentication delegation has been enabled, wherein enabling the two-factor authentication delegation includes identifying a delegate that is authorized to use the vehicular service;

in response to determining that the two-factor authentication delegation has been enabled, generating a two-factor random code; and sending the two-factor random code to the delegate.

5. The method of claim 4, further comprising:
requesting the two-factor random code from the delegate;
receiving the two-factor random code from the delegate; and
in response to receiving the two-factor random code from the delegate, providing the vehicular service.

6. The method of claim 4, further comprising:
requesting the two-factor random code from the delegate;
in response to requesting the two-factor random code from the delegate, receiving an entry from the vehicle user;
determining that the entry does not match the two-factor random code; and
in response to determining that the entry does not match the two-factor random code, refraining from providing the vehicular service.

7. The method of claim 6, further comprising:
counting a number of times that the vehicle user has provided an input that does match the two-factor random code; and
in response to determining that the vehicle user has provided the input that does not match the two-factor random code more than a predetermined number of times, sending the notification to the registered vehicle operator of the vehicle that an unauthorized entry of the vehicle has occurred.

8. The method of claim 1, wherein determining whether the registered vehicle operator of the vehicle is the vehicle user that requested the vehicular service includes using facial recognition to determine whether the registered vehicle operator is the vehicle user that requested the vehicular service.

9. The method of claim 1, wherein determining whether the registered vehicle operator of the vehicle is the vehicle user that requested the vehicular service includes using voice recognition to determine whether the registered vehicle operator is the vehicle user that requested the vehicular service.

10. The method of claim 1, wherein determining whether the registered vehicle operator of the vehicle is the vehicle user that requested the vehicular service includes using fingerprint authentication to determine whether the registered vehicle operator is the vehicle user that requested the vehicular service.

11. A system for authenticating and securing a vehicular service, comprising:
a plurality of sensors;
a communication transceiver;
a controller in communication with the plurality of sensors and the communication transceiver, wherein the controller is programmed to:
receive an activation signal, wherein the activation signal is indicative that the vehicular service has been requested by a vehicle user;
in response to receiving the activation signal, determining whether the vehicular service is a subscription-based vehicular service;

in response to determining that the vehicular service is a subscription-based vehicular service, determining whether the subscription-based vehicular service has been enabled via payment;

in response to determining that the subscription-based vehicular service is enabled, determine whether a registered vehicle operator of a vehicle is the vehicle user that requested the vehicular service; and in response to determining that the registered vehicle operator of the vehicle is not the vehicle user that requested the vehicular service, send a notification to the registered vehicle operator of the vehicle that an unauthorized entry of the vehicle has occurred.

12. The system of claim 11, wherein the controller is programmed to: in response to determining that the registered vehicle operator of the vehicle is the vehicle user that requested the vehicular service, request a pre-authenticated code;
receive the pre-authenticated code; and
in response to receiving the pre-authenticated code, provide the vehicular service.

13. The system of claim 12, wherein the vehicular service includes sending a garage door signal to remotely open or close a garage door.

14. The system of claim 12, wherein the controller is programmed to:
in response to determining that the registered vehicle operator of the vehicle is not the vehicle user that requested the vehicular service, determine whether two-factor authentication delegation has been enabled, wherein enabling the two-factor authentication delegation includes identifying a delegate that is authorized to use the vehicular service;
in response to determining that the two-factor authentication delegation has been enabled, generate a two-factor random code; and
send the two-factor random code to the delegate.

15. The system of claim 14, wherein the controller is programmed to:
request the two-factor random code from the delegate;
receive the two-factor random code from the delegate; and
in response to receiving the two-factor random code from the delegate, provide the vehicular service.

16. The system of claim 14, wherein the controller is programmed to:
request the two-factor random code from the delegate;
in response to requesting the two-factor random code from the delegate, receive an input from the vehicle user;
determine that the input does not match the two-factor random code; and
in response to determining that the input does not match the two-factor random code, refrain from providing the vehicular service.

17. The system of claim 16, wherein the controller is programmed to:
count a number of times that the vehicle user has provided an entry that does match the two-factor random code; and
in response to determining that the vehicle user has provided the input that does not match the two-factor random code more than a predetermined number of times, send the notification to the registered vehicle operator of the vehicle that an unauthorized entry of the vehicle has occurred.

18. The system of claim 11, wherein the controller is programmed to use facial recognition to determine whether the registered vehicle operator is the vehicle user that requested the vehicular service.

19. The system of claim 11, wherein the controller is programmed to use voice recognition to determine whether the registered vehicle operator is the vehicle user that requested the vehicular service.

20. A method of authenticating and securing a vehicular service, comprising:
- receiving, by a controller of a vehicle, an activation signal, wherein the activation signal is indicative that the vehicular service has been requested by a vehicle user;
- in response to receiving the activation signal, determining whether the vehicular service is a subscription-based vehicular service;
- in response to determining that the vehicular service is a subscription-based vehicular service, determining whether the subscription-based vehicular service has been enabled via payment;
- in response to determining that the subscription-based vehicular service is enabled, determining whether a registered vehicle operator of the vehicle is the vehicle user that requested the vehicular service; and
- in response to determining that the registered vehicle operator of the vehicle is the vehicle user that requested the vehicular service and the vehicular service has been enabled via payment, providing the vehicular service.

* * * * *